Figure 1:
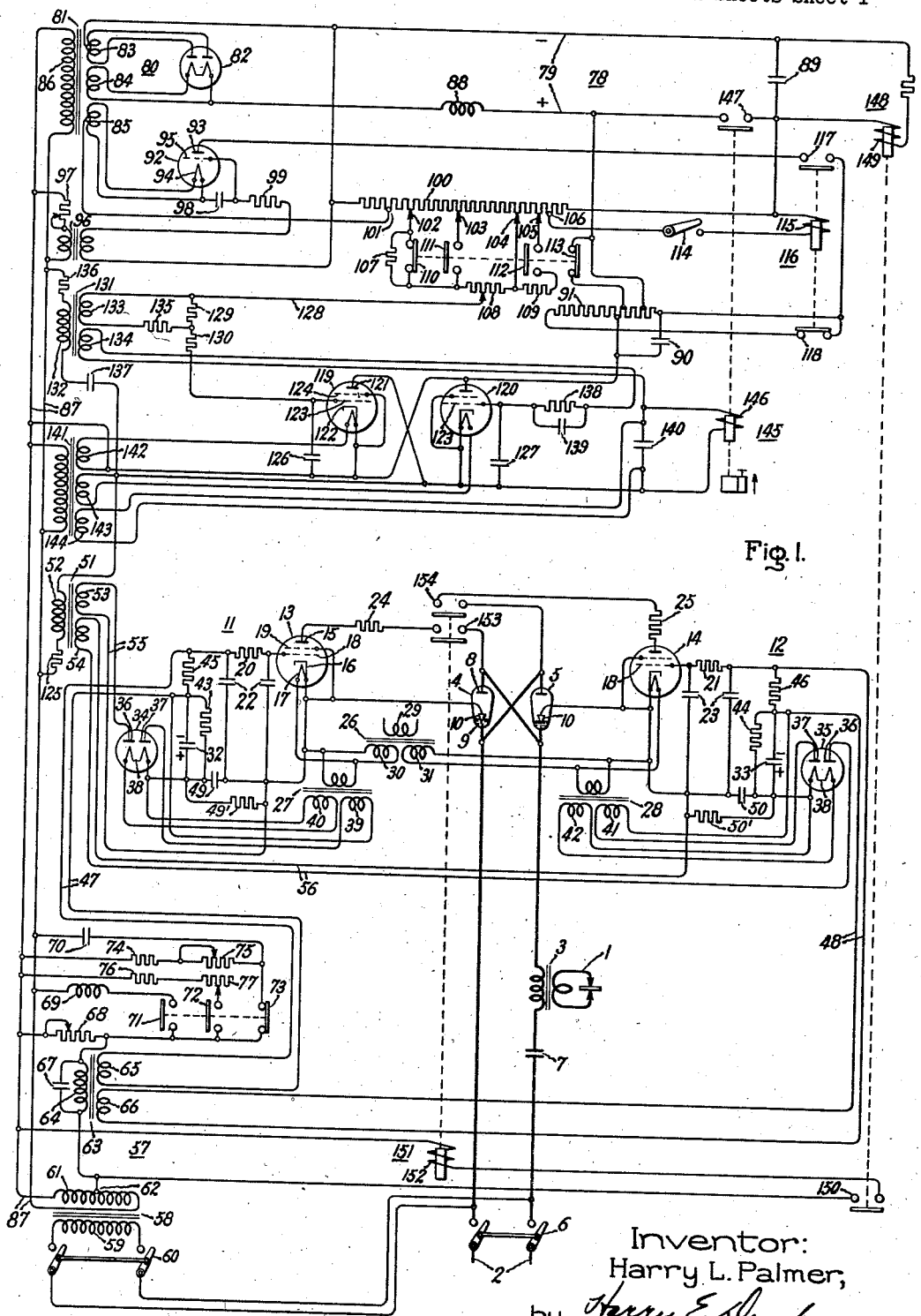

Inventor:
Harry L. Palmer,
by Harry E. Dunham
His Attorney.

Patented May 19, 1942

2,283,647

UNITED STATES PATENT OFFICE 2,283,647

ELECTRIC VALVE CONTROL SYSTEM

Harry L. Palmer, Schenectady, N. Y., assignor to General Electric Company, a corporation of New York Application April 5, 1941, Serial No. 387,051

13 Claims. (Cl. 250—27)

My invention relates to electric valve translating apparatus and more particularly to control circuits for controlling the conductivity of electric valve means, such as electric valve apparatus, employing ionizable mediums.

Where electric valve translating apparatus is connected between an alternating current supply circuit and a load circuit, it is frequently desirable to control the conductivity of the electric valve means to effect energization of the load circuit during a predetermined interval of time and to determine the amount of power transmitted to the load circuit during the interval of time. Furthermore, in order to obtain the desired operating characteristics of the translating apparatus and to control accurately the amount of power transmitted to the load circuit, it is important in many instances to provide control apparatus which initiates conduction of the electric translating apparatus or the electric valve means at a precise time during applied cycles of anode-cathode voltage. In accordance with the teachings of my invention described hereinafter, I provide a new and improved control system which effects the above described type of control in an expeditious manner and which employs apparatus of simple construction and arrangement.

It is an object of my invention to provide a new and improved electric translating system.

It is another object of my invention to provide a new and improved electric valve control system for electric translating apparatus.

It is a further object of my invention to provide new and improved electric translating apparatus including electric valve means or electric discharge apparatus wherein a load circuit is energized from an alternating current supply circuit.

It is a still further object of my invention to provide a new and improved control system for electric translating apparatus for transmitting power to a load circuit from an alternating current supply circuit, and wherein greater flexibility and range of control of the amount of power transmitted to the load circuit are obtainable.

Briefly stated, in the illustrated embodiment of my invention I provide a new and improved control system for electric valve translating apparatus which effects energization of a load circuit from an alternating current supply circuit during an accurately determinable interval of time, and which includes apparatus for controlling the amount of power transmitted to the load circuit during that interval. Power factor correction apparatus, such as a series connected capacitance, is employed so that the power drawn from the alternating current supply circuit is obtained at substantially unity power factor. The control circuit for the electric valve means produces a unidirectional voltage which renders the electric valve means conducting in response to a timing voltage produced by a timing means. The unidirectional voltage is obtained by charging a capacitance from a source of alternating current through a unidirectional conducting device, and the capacitance is charged immediately prior to the normal or intended half cycles of conduction of the electric valve means. This relationship may be obtained by the proper poling of the windings of a transformer which charges the capacitance through the unidirectional conducting device. An additional control voltage, adjustable in phase, is provided in order to control the time of initiation of conduction of the electric valve means and to control the amount of power transmitted to the load circuit during the interval of time. By virtue of the use of a substantially constant hold-off or negative unidirectional biasing potential, the range of accurate control of the conductivity of the electric valve means is substantially increased.

Figure 2:
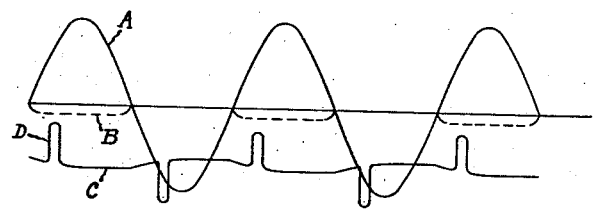
Figure 3:
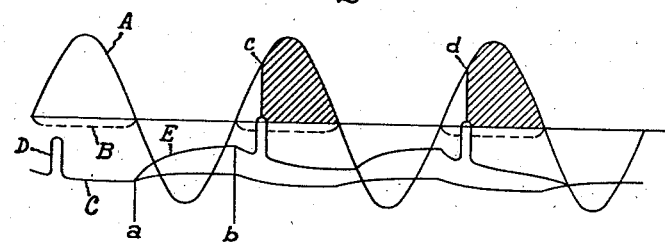
Figure 4:
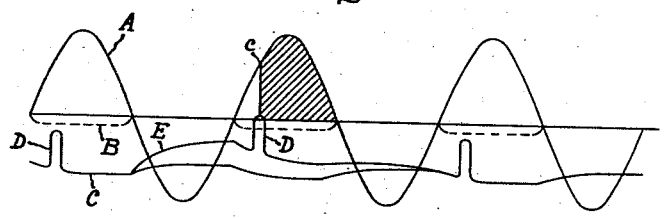

For a better understanding of my invention, reference may be had to the following description taken in connection with the accompanying drawings, and its scope will be pointed out in the appended claims. Fig. 1 of the drawings diagrammatically illustrates an embodiment of my invention as applied to an electric valve system for energizing a load circuit, such as a welding circuit, and Figs. 2–4 represent certain operating characteristics of the arrangement shown in Fig. 1.

Referring now to the embodiment of my invention shown in Fig. 1, I have chosen to illustrate my invention as applied to an electric translating system for energizing a load circuit, such as a welding circuit 1, from an alternating current supply circuit 2 through translating apparatus including a transformer 3 and a pair of reversely connected electric valve means 4 and 5. A suitable circuit controlling means or switch 6 may be connected between the supply circuit 2 and the translating apparatus. If desired, my invention may be applied to a system in which power factor correction means, such as a series capacitance 7, is connected in series relation with the primary winding of transformer 3 and the electric valve means 4 and 5. The use of the series capacitance 7 in a system of this nature to effect power factor improvement and to prevent cumulative unidirectional magnetization of the transformer 3 is disclosed and claimed broadly in a copending patent application Serial No. 290,602, filed August 17, 1939, of Louis G. Levoy, Jr., and which is assigned to the assignee of the present application.

The electric valve means 4 and 5 are preferably of the type employing an ionizable medium, such as a gas or a vapor, and each may comprise an anode 8, a mercury pool cathode 9 and a control means or control member 10 which may be of the immersion-igniter type having an extremity thereof extending into the mercury of the associated cathode. The control members 10 are preferably constructed of a material having an electrical resistivity which is relatively large as compared with that of mercury. The control members 10 may be constructed of a suitable material such as boron carbide or silicon carbide.

I provide control or excitation circuits 11 and 12 which are associated with electric valve means 4 and 5 and which comprise trigger or control electric discharge devices 13 and 14, respectively. These electric discharge devices are also preferably of the type employing an ionizable medium, such as a gas or a vapor, and each may comprise an anode 15, a cathode 16, a cathode heating element 17 and a control means. The control means may include a control member 18 and a shield grid 19 which is preferably connected to the cathode 16. Excitation circuits 11 and 12 comprise resistances 20, 21 and capacitances 22, 23, respectively, which are employed as filtering means to absorb undesirable voltage transients which may be present in these excitation circuits. The electric discharge devices 13 and 14 are arranged to be responsive to the polarity of the anode-cathode voltages of the respective main associated electric valve means 4 and 5 and are connected to the anodes 8 thereof through current limiting resistances 24 and 25, respectively.

As a means for impressing on the control grids 18 of the electric discharge devices 13 and 14 hold-off or negative unidirectional biasing potentials, I provide transformers 26, 27 and 28. Primary winding 29 of transformer 26 may be energized from any suitable source of alternating current correlated in frequency with respect to the voltage of circuit 2, or may be energized from circuit 2. Secondary windings 30 and 31 of transformer 26 may be used to energize the cathode heating elements of the control electric discharge devices 13 and 14. The transformer 26 may also be used for an additional purpose; that is, it may be used to charge capacitances 32 and 33 in excitation circuits 11 and 12 which produce the negative unidirectional biasing potentials. For example, windings 30 and 31 of transformer 26 may be connected to energize transformers 27 and 28, and suitable unidirectional conducting devices 34 and 35 may be connected between transformers 27 and 28, capacitances 32 and 33, respectively, in order to charge these capacitances. The unidirectional conducting devices 34 and 35 may be of the gaseous type and each may comprise a pair of anodes 36 and 37 and an electrically common cathode 38. The right-hand unidirectional conducting path of unidirectional conducting device 34 may be employed to charge capacitance 32 from secondary winding 39 of transformer 27. Secondary winding 40 may be employed to energize the cathode heating elements of unidirectional conducting device 34. In like manner, capacitance 33 in excitation circuit 12 may be charged through the left-hand anode 37 of unidirectional conducting device 35 from secondary winding 41 of transformer 28. Secondary winding 42 of this transformer may be employed to energize the cathode heating element of unidirectional conducting device 35.

Resistances 43 and 44 of relatively large value are connected across capacitances 32 and 33 in order to provide a discharge path for these capacitances. These resistances are proportioned so that the charge of the capacitance does not decrease substantially during the half cycles intermediate the half cycles during which the capacitances are charged. Inasmuch as the capacitances 32 and 33 are charged during alternate half cycles of voltage derived from transformers 27 and 28, it will be appreciated that it is necessary to limit the rate of discharge of these capacitances in order to maintain the desired biasing potential.

I also provide in excitation circuits 11 and 12 suitable impedance elements, such as resistances 45 and 46, across which appear suitable voltages which tend to render the control electric discharge devices 13 and 14 conducting. These voltages may be periodic or alternating voltages of peaked wave form furnished by circuits 47 and 48 and which are of a magnitude not sufficient in themselves to overcome the effect of the negative biasing potentials produced by capacitances 32 and 33. I also provide in excitation circuits 11 and 12 means for producing a single impulse of positive unidirectional voltage, or a train of positive unidirectional impulses, which when cooperating with the voltages of peaked wave form appearing across resistances 45 and 46 are effective to render the control electric discharge devices 13 and 14 conducting and consequently render the main electric valve means 4 and 5 conducting to effect energization of the load circuit 1 for a corresponding interval of time. This means comprises capacitances 49 and 50 which are charged through suitable unidirectional conducting devices, such as the discharge paths furnished by anodes 36 of unidirectional conducting devices 34 and 35. The capacitances 49 and 50 are energized from a suitable transformer 51 having a primary winding 52 and secondary windings 53 and 54. The secondary winding 53 is connected to charge capacitance 49 through a circuit 55, and secondary winding 54 is connected to charge capacitance 50 through a circuit 56. Suitable discharge circuits comprising resistances 49' and 50' are connected across capacitances 49 and 50, respectively, and the values of these resistances are chosen so that the time constant of the discharge circuit is such as to maintain a substantial charge for one-half-cycle, but to permit substantial decay of the positive voltage produced by capacitances 49 and 50 within an interval of time somewhat less than one cycle of voltage of circuit 2. Transformer 51 is connected to be energized through coupling electric discharge devices, described hereinafter, and the secondary windings 53 and 54 are poled to charge the capacitances 49 and 50 immediately preceding the first intended half cycle of conduction of the control electric discharge devices 13 and 14 and electric valve means 4 and 5.

As a means for transmitting alternating voltages of peaked wave form to the excitation circuits 11 and 12 through circuits 47 and 48, I provide a phase control circuit 57 which may comprise a transformer 58 having a primary winding 59 which is connected to supply circuit 2 through a switch 60. Transformer 58 is also provided with a secondary winding 61 having an intermediate connection 62. As a means for producing the alternating voltage of peaked wave form, I provide a suitable transformer, such as a saturable transformer 63, having a primary winding 64 and a pair of secondary windings 65 and 66 which are connected to circuits 47 and 48, respectively. A capacitance 67 may be connected across the primary winding 64 to compensate for the magnetizing current conducted by the transformer. In control circuit 57, I employ a phase shifting circuit which is energized from secondary winding 61 and which comprises an adjustable resistance 68, one terminal of which is connected to the left-hand terminal of secondary winding 61 and the other terminal of which is connected to primary winding 64. The phase shifting circuit also includes one branch which comprises an inductance 69 and a second branch which comprises a capacitance 70. Suitable circuit controlling means, such as switches 71, 72 and 73, may be employed to selectively connect and disconnect the inductance 69 and the capacitance 70 in the phase shifting circuit in order to obtain different predetermined ranges of phase shift or phase displacement of the periodic voltages of peaked wave form supplied to circuits 47 and 48. Resistances 74 and 75 may be connected in circuit to determine the range of phase shift of the periodic voltages obtained, and additional resistances 76 and 77 may be connected to the circuit through the switch or contactor 72. The phase shifting circuit, including secondary winding 61, the peaking transformer 63 and the associated resistance 68, inductance 69 and capacitance 70, is broadly claimed in United States Letters Patent No. 2,228,843, granted January 14, 1941, upon my application, and which is assigned to the assignee of the present application. The switches 71 and 73 may be arranged so that upon closure of one switch the other is opened so that the phase of the periodic voltage of peaked wave form may be shifted throughout different predetermined ranges. The phase of the periodic voltages may be controlled or adjusted throughout the respective ranges by means of the adjustable resistance 68. Adjustment of resistances 75 and 77 also may be employed to control the range of phase shift of the voltages within the respective regions of phase shift.

I provide a timing circuit 78 which produces a timing voltage which in turn determines the period of conduction of the electric valve means 4 and 5 and, hence, determines the period of energization of welding circuit 1. The timing voltage is controlled to render the electric valve means 4 and 5 conducting for a predetermined number of half cycles of voltage of circuit 2. Timing circuit 78 may comprise a suitable source of direct current 79. This source of direct current may be provided by means of a rectifying circuit 80 which may be of the bi-phase type comprising a transformer 81 and a pair of unidirectional conducting paths provided by a rectifying device 82. Transformer 81 may be provided with a winding 83 which is connected to the anodes of the rectifying device 82, and may also be provided with secondary windings 84 and 85 which serve as sources of cathode heating current. Primary winding 86 is connected to circuit 87 which is energized from secondary winding 61 of transformer 58. A suitable filtering inductance 88 and a capacitance 89 may be connected across the direct current source.

As a means for producing the timing voltage, I provide a capacitance 90 which is connected to be charged from the direct current source 79 through a portion of a resistance 91 and a control electric valve 92. The electric valve 92 is preferably of the type employing an ionizable medium, such as a gas or a vapor, and comprises an anode 93, a cathode 94 and a control grid 95. The electric valve 92 is rendered conducting precisely at a predetermined time during the cycle of voltage of circuit 2 or circuit 87 by means of a transformer 96 which may be of the type designed to produce a voltage of peaked wave form. This transformer may be of the type which employs a resistance 97 connected in series relation with the primary winding and this resistance may be adjustable to control the phase relationship of the peak voltage with respect to the voltage of the supply circuit. A suitable filtering capacitance 98 may be connected between the cathode and control member of electric valve 92 and a current limiting resistance 99 may be connected in series relation between the secondary winding of transformer 96 and control grid 95. In order to control the magnitude and the wave shape of the timing voltage produced by circuit 78, I provide a resistance 100 having a plurality of taps 101—106, inclusive, and which is connected across the source 79. The effective value of resistance 100 may be adjusted by means of resistances 107, 108 and 109 and by means of associated gang switches 110, 111, 112 and 113.

In order to initiate operation of the timing circuit 78, I provide an initiating switch 114 which is energized in response to the voltage appearing across a portion of resistance 100 and which energizes an actuating coil 115 of relay 116 which is provided with contacts 117 connected in series relation with the anode-cathode circuit of electric valve 92, and is also provided with contacts 118 which close a discharge circuit for capacitance 90. The contacts 118 may be connected across the resistance 91 and when in the closed circuit position provide a path for dissipating the energy stored in capacitance 90.

As an agency for supplying to the transformer 51, particularly primary winding 52 thereof, a predetermined number of half cycles of current corresponding to the desired period of energization of the welding circuit 1 determined by the timing voltage produced by timing circuit 78, I provide electric valve means, such as a pair of coupling or control electric discharge devices 119 and 120, which are also preferably of the type employing an ionizable medium, such as a gas or a vapor, and each of which includes an anode 121, a cathode 122 and control means such as a control grid 123 and a shield grid 124 which is preferably connected to the associated cathode 122. The electric discharge devices 119 and 120 are connected reversely in parallel so that alternating current is transmitted to primary winding 52 through a current limiting resistance 125 from the alternating current circuit 87. Transient absorbing capacitances 126 and 127 may be connected between the control grids and cathodes of the electric discharge devices 119 and 120, respectively. The electric discharge devices 119 and 120 may be arranged in a leading and trailing relationship; that is, the electric discharge device 119 may be controlled directly with respect to the timing voltage produced by circuit 78 through a conductor 128 and resistances 129 and 130, and the electric discharge device 120 may be connected to conduct current in response to the conductivity of the electric discharge device 119. This control may be obtained by means of a transformer 131 having a primary winding 132 and secondary windings 133 and 134. Secondary winding 133 is connected to impress an alternating component of voltage on control grid 123 of discharge device 119 through a resistance 135 and resistances 129 and 130; and the secondary winding 134 is connected to the grid 123 of discharge device 120 to impress a relatively positive voltage on control grid 123 in response to the conductivity of electric discharge device 119. It will be noted that primary winding 132 is connected to be energized from circuit 87 through the electric discharge devices 119 and 120. A current limiting resistance 136 and a phase displacing capacitance 137 may be connected in series relation with primary winding 132. This means serves to prevent the imposition of a substantial lagging current on circuit 87 when the electric discharge devices 119 and 120 are rendered conducting, and also serves to obtain the desired phase displacement between the voltage produced by transformer 131 relative to the voltage of circuit 87.

The excitation circuit which is connected to grid 123 of electric discharge device 120 may include means for producing a suitable negative biasing potential, such as a parallel connected resistance 138 and capacitance 139 which operate as a self-rectifying biasing source. A capacitance 140 may also be connected in series relation with secondary winding 134 and connected to be energized by a suitable source of alternating current for impressing a hold-off voltage on grid 123 of discharge device 120. This hold-off voltage may be obtained from circuit 87 through a transformer 141 including secondary winding 144. Secondary windings 142 and 143 may be employed as sources for energizing the cathode heating elements of electric discharge devices 119 and 120, and secondary winding 144 may be employed as a source of hold-off voltage. The magnitude of the voltage produced by secondary winding 144 is sufficient to maintain the discharge device 120 non-conducting when transformer 131 is not energized. However, when transformer 131 is energized, the voltage produced by secondary winding 134 is sufficient to overcome the effect of winding 144 and the discharge device 120 is rendered conducting.

I employ protecting means, such as time delay apparatus, for preventing operation of the system until the cathodes of the various electric discharge devices have attained safe operating temperatures. For example, I provide a time delay relay 145 having an actuating coil 146 and contacts 147. Actuating coil 146 is connected to be energized from circuit 87 through transformer 58 and switch 60. After a predetermined time delay, contacts 147 are closed. I also provide another protective relay 148 having an actuating coil 149 and contacts 150 which is energized upon closure of contacts 147 of relay 145. When contacts 150 of relay 148 close, a relay 151 is energized having an actuating coil 152 which closes its contacts 153 and 154 which are connected in the anode-cathode circuits of control electric discharge devices 13 and 14.

The operation of the embodiment of my invention shown in Fig. 1 will be explained by considering the system when it is operating to transmit current to the welding circuit 1 during a predetermined interval of time. Initially, switches 6 and 60 are closed. Closure of these switches supplies current to the cathode heating elements of the various electric discharge devices. Closure of the actuating switch 114 prior to the timing operation of relay 145 is not effective because current will not be supplied to the actuating coil 115 of relay 116 since contacts 147 are open. After the expiration of a predetermined interval of time within which the cathodes assume safe operating temperatures, relay 145 closes its contacts 147. Closure of contacts 147 energizes relay 148 which, in turn, closes its contacts 150 and energizes relay 151 to close the anode-cathode circuits of the control discharge devices 13 and 14. The discharge devices 13, 14, electric valve means 4 and 5, discharge devices 119, 120 and electric valve means 92 are maintained nonconducting. When it is desired to initiate the welding operation, that is to initiate the transmission of current to welding circuit 1, the initiating switch 114 is closed. Upon closure of this switch, current is transmitted from the positive terminal of source 79 through resistance 100. The transmission of current through the right-hand portion of resistance 100 produces thereacross a sufficient voltage to energize actuating coil 115 of relay 116 which closes its contacts 117 and opens its contacts 118. Opening of contacts 118 removes the discharge circuit from the terminals of capacitance 99 and the capacitance 90 begins to charge through the electric valve means 92 which is rendered conducting at a predetermined time established by the peaked voltage of transformer 96. Positive charging current flows to the lower plate of capacitance 90 through the following circuit: the positive terminal of source 79, capacitance 99, contacts 117, the anode-cathode circuit of electric valve 92, the extreme left-hand portion of resistance 100 and the negative terminal of the direct current source 79. As the capacitance 90 is charged, discharge device 119 conducts current, and as the lower plate becomes more positive the potential of cathode 122 of discharge device 119 is gradually raised until a point is reached which renders the discharge device 119 nonconducting. Of course, it will be understood that during the charging period of capacitance 90, discharge device 119 is conducting until the charge of capacitance 90 attains a predetermined value. Conduction of current by electric discharge device 119 effects energization of primary winding 132 of transformer 131 to induce a voltage in secondary winding 134. The voltage of this winding is sufficient to overcome the effect of the hold-off potential produced by winding 144 of transformer 141 and the electric discharge device 120 is rendered conducting. The number of cycles during which the electric discharge devices 119 and 120 conduct current is, of course, determined by the duration of the timing voltage produced by circuit 78. The duration of the timing voltage may be obtained by adjustment of the contacts associated with resistances 100 and 108.

Upon being rendered conducting, electric discharge devices 119 and 120 transmit alternating current to the primary winding 52 of transformer 51 from circuit 87. The energization of this primary winding produces in excitation circuits 11 and 12 positive unidirectional voltages sufficient to render the control electric discharge devices 13 and 14 conducting and, hence, cause the transmission of current impulses to immersion-igniter control members 10 of electric valve means 4 and 5, consequently effecting energization of the welding circuit 1.

The operation of the excitation circuits 11 and 12 will now be considered more in detail. Prior to the energization of transformer 51, the electric discharge devices 13 and 14 are maintained nonconducting. This condition is obtained by the negative unidirectional biasing potentials produced by capacitances 32 and 33 which are charged by anodes 37 of unidirectional conducting devices 34 and 35, respectively. The periodic voltages of peaked wave form appearing across resistances 45 and 46 are not sufficient in themselves to overcome the effect of this negative biasing potential. However, upon energization of transformer 51, capacitances 49 and 50 are energized from secondary windings 53 and 54 through anodes 36 of unidirectional conducting devices 34 and 35 to produce across the terminals of capacitances 49 and 50 positive unidirectional voltages which cooperating with the voltages of peaked wave form appearing across resistances 45 and 46 are sufficient to render the electric discharge devices 13 and 14 conducting. Windings 43 and 44 are poled relative to the electric discharge devices 13 and 14 so that the capacitances 49 and 50 are charged during the half cycles immediately preceding each normal or intended half cycle of conduction of electric discharge devices 13 and 14 respectively. The positive unidirectional voltages produced by capacitances 49 and 50 are, of course, obtained by half wave rectification. The charging circuit for the capacitances effects rapid charge of these capacitances and the charges decay at such a rate that sufficient voltage will remain thereon to turn on the electric discharge devices or render these discharge devices conducting in cooperation with the voltages of peaked wave form throughout the entire positive half cycles of applied anode-cathode voltage. However, the discharge circuits, including resistances 49' and 50', are designed so that the positive unidirectional impulses of voltage will decay before the next positive half cycle of voltage. In this manner, it is possible to obtain control of the conductivities of electric discharge devices 13 and 14 in one-cycle steps by the employment of a direct current turn-on voltage.

The operation of the embodiment of my invention shown in Fig. 1 may be more fully explained by referring to the operating characteristics shown in Figs. 2-4, inclusive. In Fig. 2 the curve A represents the voltage applied to one of the main electric valves and associated control electric discharge device, such as electric valve means 4 and control discharge device 13. The curve B represents the critical control characteristic or turn-on characteristic of the discharge device 13. Curve C represents the magnitude of the negative unidirectional biasing potential appearing across capacitance 32, and curve D represents the voltage of peaked wave form appearing across the terminals of resistance 45. It will be noted that the magnitude of the peaked voltage is insufficient to intersect the characteristic B and that consequently the electric discharge device 13 is not rendered conducting, electric valve means 14 is not rendered conducting, and no current is transmitted to the welding circuit.

In Fig. 3 the corresponding curves have been assigned like reference characters. In addition, however, the effect of energization of transformer 51 is shown by curve E which represents the magnitude of the positive unidirectional voltage appearing across capcitance 49. It will be noted that the capacitance 49 is charged during the interval or half cycle a—b which immediately precedes the positive half cycles of conduction, thereby raising the voltage of peaked wave form to intersect the control characteristic B at approximately time c to render the electric discharge device conducting. At time c an impulse of current is transmitted to control member 10, render electric valve means 4 conducting and effecting energization of the welding circuit 1 during intervals indicated by the shaded areas. During the succeeding half cycles of opposite polarity, it will be understood that the excitation circuit 12 will operate in a similar manner to render the electric discharge device 14 conducting and consequently cause conduction of current by electric valve means 5 so that alternating current is transmitted to welding circuit 1. The operating characteristics of Fig. 3 indicate operation of the system when the timing circuit 78 is adjusted to transmit current to the welding circuit 2 during an interval of time corresponding to two cycles. At time d, the electric discharge device 13 will again be rendered conducting, causing electric valve means 4 to conduct current. Of course, electric valve means 5 conducts during the following half cycle.

The operating characteristics shown in Fig. 4 represent the operation of the system when it is adjusted to transmit current to the welding circuit 1 during only one cycle in response to a single operation of the initiating switch 114. It will be noted that the discharge circuit for capacitance 49 is adjusted so that the positive unidirectional turn-on voltage decays sufficiently during one cycle so that the voltage of peaked wave form D is not sufficient to render the electric valve means conducting unless another impulse of positive current is transmitted to the capacitance 49. Of course, such an additional impulse will not be transmitted unless the timing circuit 78 dictates a period of energization of that duration.

The duration of the timing voltage produced by circuit 78 is determined by the characteristics of that circuit and only one timing impulse is produced upon a single closure of switch 114. If it is desired to reset the system, the switch 114 is moved to the open circuit position whereupon actuating coil 115 of relay 116 is deenergized effecting closure of contacts 118 to discharge capacitance 90 and to open contacts 117. Upon opening contacts 117, electric valve 92 is rendered nonconducting due to the fact that its anode-cathode circuit is opened. A subsequent closure of switch 114 will initiate the above described operation.

The excitation circuits 11 and 12 permit great flexibility in control of the conductivity of the discharge devices 13 and 14 and electric valve means 4 and 5. The provision of accurately determinable positive unidirectional voltages for controlling discharge devices 13 and 14 which may be produced to control the conductivities of these devices in one-cycle steps, also permits a wider range in the control of the conductivities than that afforded by the prior art arrangements. For example, if the hold-off voltage for the discharge devices 13 and 14 were alternating, there would be a definite limitation to the amount of accurate phase control which could be applied to the control grids 116 without involving a corresponding shift in the phase of the hold-off voltage. Where power factor correction apparatus, such as capacitance 7, is employed, it is desirable to employ a negative unidirectional biasing potential in combination with the positive unidirectional control voltage to obtain not only the wide range of phase control and the consequent wide range in variation in the conductivities of the discharge devices 13 and 14 throughout the cycles of anode-cathode voltage, but also to obtain the control of the conductivities in one-cycle steps.

The amount of power transmitted to welding circuit 1 during the periods of time established by circuit 78 may be adjusted or controlled by means of resistance 68 which determines the phase relationship of the voltages of peaked wave form relative to the applied anode-cathode voltage of discharge devices 13 and 14. The discharge circuits for capacitances 49 and 50 are designed so that heat control or control of the magnitude of the current transmitted to the welding circuit may be obtained by variation of the peak throughout the entire positive half cycle of anode-cathode voltage. In other words, this means that the discharge rate of the capacitances 49 and 50 is such as to maintain the positive voltage of these capacitances sufficiently high to permit the voltages of peaked wave form to render the discharge devices 13 and 14 conducting at any time during a dictated positive half cycle, or during a consecutive number of dictated positive half cycles.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States, is:

1. In combination, an alternating current supply circuit, a load circuit, electric translating apparatus connecting said supply circuit and said load circuit and comprising electric valve means having a control means, means for impressing on said control means a hold-off potential tending to maintain said electric valve means nonconducting, means for impressing on said control means a control voltage which tends to render said electric valve means conducting but of a value which in itself is not sufficient to overcome the effect of said hold-off potential, and means energized from said supply circuit for impressing on said control member a unidirectional voltage timed with respect to the voltage of said supply circuit and which cooperating with said control voltage is sufficient to overcome the effect of said hold-off voltage and which comprises a capacitance and a coupling electric discharge device connected between said alternating current circuit and said capacitance for effecting charge of said capacitance from said supply circuit.

2. In combination, an alternating current supply circuit, a load circuit, electric translating apparatus connecting said supply circuit and said load circuit and comprising electric valve means having a control means, means for impressing on said control means a hold-off potential tending to maintain said electric valve means nonconducting, means for impressing on said control means a control voltage which tends to render said electric valve means conducting but of a value which in itself is not sufficient to overcome the effect of said hold-off potential, and means energized from said supply circuit for impressing on said control means a periodic unidirectional voltage timed with respect to the voltage of said supply circuit and which cooperating with said control voltage is sufficient to overcome the effect of said holdoff potential and which comprises a capacitance, a charging circuit for said capacitance including a unidirectional conducting device and a coupling electric discharge device for transmitting energy from said alternating current circuit to said capacitance through said unidirectional conducting device and a discharge circuit for said capacitance.

3. In combination, an alternating current supply circuit, a load circuit, electric translating apparatus connecting said supply circuit and said load circuit and comprising electric valve means having a control means, means for impressing on said control means a hold-off potential tending to maintain said electric valve means nonconducting, means for impressing on said control means a control voltage which tends to render said electric valve means conducting but of a value which in itself is not sufficient to overcome the effect of said hold-off potential, and means energized from said supply circuit for impressing on said control means a periodic unidirectional voltage timed with respect to the voltage of said supply circuit and which cooperating with said control voltage is sufficient to overcome the effect of said hold-off potential and which comprises a capacitance, a unidirectional conducting device, a transformer having a primary winding and a secondary winding connected to charge said capacitance through said unidirectional conducting device, a coupling electric discharge device connected between said alternating current supply circuit and said primary winding and a discharge circuit for said capacitance.

4. In combination, an alternating current supply circuit, a load circuit, electric translating apparatus connecting said supply circuit and said load circuit and comprising electric valve means having a control means, means for impressing on said control means a hold-off potential tending to maintain said electric valve means nonconducting, means for impressing on said control means a control voltage which tends to render said electric valve means conducting but of a value which in itself is not sufficient to overcome the effect of said hold-off potential, and means for impressing on said control means a periodic unidirectional voltage which cooperating with said control voltage is sufficient to overcome the effect of said hold-off potential and which comprises a capacitance, a unidirectional conducting device, a transformer having a primary winding and a secondary winding connected to charge said capacitance through said unidirectional conducting device, a coupling electric discharge device connected between said supply circuit and said primary winding to determine the times of energization of said transformer and a discharge circuit for said capacitance, said discharge circuit having a time-constant less than one period of the voltage of said supply circuit and said secondary winding being poled to effect charge of said capacitance prior to the intended period of conduction of said electric valve means.

5. In combination, an alternating current supply circuit, a load circuit, electric translating apparatus connecting said supply circuit and said load circuit and comprising electric valve means having an anode, a cathode and a control means, the potential impressed across said electric valve means periodically reversing in polarity in accordance with the variations in the voltage of said supply circuit, means for impressing on said control means a hold-off potential tending to maintain said electric valve means nonconducting, means for impressing on said control means a control voltage which tends to render said electric valve means conducting but of a value which in itself is not sufficient to overcome the effect of said hold-off potential, and means for impressing on said control means a periodic unidirectional voltage which cooperating with said control voltage is sufficient to overcome the effect of said hold-off potential and which comprises a capacitance and means for charging said capacitance during the negative half cycle immediately preceding each positive half cycle of conduction.

6. In combination, an alternating current supply circuit, a load circuit, electric translating apparatus connected between said supply circuit and said load circuit and comprising electric valve means having control means for controlling the power transmitted from said supply circuit to said load circuit, means for controlling the power factor of the current derived from said supply circuit, means for impressing on said control means a hold-off potential tending to maintain said electric valve means non-conducting, means for impressing on said control means a control voltage which tends to render said electric valve means conducting but of a magnitude which in itself is not sufficient to overcome the effect of the hold-off potential, means energized from said supply circuit for impressing on said control member a periodic unidirectional voltage timed with respect to the voltage of said supply circuit and which cooperating with said control voltage is sufficient to overcome the effect of said hold-off potential and thereby render said electric valve means conducting, and means for controlling the phase relation of said control voltage relative to the voltage of said supply circuit to control the amount of power transmitted to said load circuit.

7. In combination, an alternating current supply circuit, a load circuit, electric translating apparatus connected between said supply circuit and said load circuit and comprising electric valve means having control means, power factor correction means connected between said supply circuit and said translating apparatus to effect the transmission of power between said supply circuit and said load circuit at substantially unity power factor, means for impressing on said control means a hold-off potential tending to maintain said electric valve means nonconducting, means for impressing on said control means a control voltage of peaked wave form which tends to render said electric valve means conducting but of a value which in itself is not sufficient to overcome the effect of said hold-off potential, means energized from said supply circuit for impressing on said control means a periodic unidirectional voltage timed with respect to the voltage of said supply circuit and which cooperating with said control voltage is sufficient to overcome the effect of said hold-off potential and thereby render said electric valve means conducting, and means for controlling the phase of the voltage of peaked wave form and for controlling the amount of power transmitted to said load circuit.

8. In combination, an alternating current supply circuit, a load circuit, electric translating apparatus connecting said supply circuit and said load circuit and comprising electric valve means having control means, means for impressing on said control means a hold-off potential tending to maintain said electric valve means nonconducting and comprising a capacitance, means for charging said capacitance including a unidirectional conducting device, means for impressing on said control means a control voltage which tends to render said electric valve means conducting but of a magnitude which in itself is not sufficient to overcome the effect of the hold-off potential, means for impressing on said control means a periodic unidirectional voltage which cooperating with said control voltage is sufficient to overcome the effect of said hold-off potential and comprising a second capacitance, a transformer having a primary winding energized from said supply circuit and a secondary winding for charging said second capacitance through a second unidirectional conducting device, said secondary winding being poled to charge said second capacitance prior to the intended positive half cycle of conduction of said electric valve means, and means for controlling the phase of said control voltage and for controlling the amount of power transmitted to said load circuit.

9. In combination, an alternating current supply circuit, a load circuit, electric translating apparatus connected between said supply circuit and said load circuit and comprising electric valve means having a control means, timing means for producing a timing voltage to effect energization of said load circuit for a predetermined number of half cycles of voltage of said supply circuit, means for impressing on said control means a hold-off potential tending to maintain said electric valve means nonconducting, means for impressing on said control means a control voltage which tends to render said electric valve means conducting but of a magnitude which in itself is not sufficient to overcome the effect of the hold-off potential, and means responsive to said timing voltage for impressing on said control means a unidirectional voltage which cooperating with said control voltage is sufficient to overcome the effect of said hold-off potential and thereby render said electric valve means conducting.

10. In combination, an alternating current supply circuit, a load circuit, electric translating apparatus connected between said supply circuit and said load circuit and comprising electric valve means having control means, timing means for producing a timing voltage to effect energization of said load circuit for a predetermined number of half cycles of voltage of said supply circuit, means for impressing on said control means a hold-off potential to maintain said electric valve means nonconducting, means for impressing on said control means a control voltage which tends to render said electric valve means conducting but of a magnitude which in itself is not sufficient to overcome the effect of the hold-off potential, and means energized from said supply circuit for impressing on said control means a periodic unidirectional voltage timed with respect to the voltage of said supply circuit and which cooperating with said control voltage is sufficient to overcome the effect of said hold-off potential and which comprises a capacitance, a unidirectional conducting device, a transformer having a primary winding and a secondary winding for charging said capacitance through said unidirectional conducting device, a discharge circuit for said capacitance and a coupling electric discharge device responsive to said timing voltage for controlling the energization of said primary winding.

11. In combination, an alternating current supply circuit, a load circuit, electric translating apparatus connected between said supply circuit and said load circuit and comprising an electric valve means having control means, timing means for producing a timing voltage to effect energization of said load circuit for a predetermined number of half cycles of voltage of said supply circuit, means for impressing on said control means a hold-off potential to maintain said electric valve means nonconducting, means for impressing on said control means a control voltage which tends to render said electric valve means conducting but of a magnitude which in itself is not sufficient to overcome the effect of the hold-off potential, and means for impressing on said control means a periodic unidirectional voltage which cooperating with said control voltage is sufficient to overcome the effect of said hold-off potential and thereby render said electric valve means conducting and comprising a capacitance, a unidirectional conducting device, a transformer having a primary winding and a secondary winding connected to charge said capacitance through said unidirectional conducting device and a control electric discharge device responsive to said timing voltage for controlling the energization of said primary winding, said secondary winding being poled to effect charge of said capacitance prior to each intended half cycle of conduction of said electric valve means.

12. In combination, an alternating current supply circuit, a load circuit, electric translating apparatus connected between said supply circuit and said load circuit and comprising electric valve means having a control means, timing means energized from said supply circuit, means responsive to an electrical quantity produced by said timing means for energizing said control means, a periodic unidirectional control voltage correlated in phase with respect to the voltage of said supply circuit and for controlling the conductivity of said electric valve means and comprising a capacitance, a unidirectional conducting device for charging said capacitance and a discharge circuit for said capacitance, said discharge circuit having a time constant to limit the rate of decay of the voltage across said capacitance to a value which permits control of the conductivity of said electric valve means throughout an entire positive half cycle of anode-cathode voltage but to effect substantial discharge of said capacitance within a period of time somewhat less than one period of the voltage of said supply circuit.

13. In combination, an alternating current supply circuit, a load circuit, electric translating apparatus connected between said supply circuit and said load circuit and comprising electric valve means having a control means, means for impressing on said control means a hold-off potential tending to maintain said electric valve means non-conducting, means for impressing on said control means a control voltage which tends to render said electric valve means conducting but of a value which in itself is not sufficient to overcome the effect of said hold-off potential, and means energized from said supply circuit for impressing on said control member a unidirectional voltage timed in phase with respect to the voltage of said supply circuit and which cooperating with said control voltage is sufficient to overcome the effect of said hold-off voltage and which comprises a capacitance and a rectifier connected between said supply circuit and said capacitance for effecting charge thereof.

HARRY L. PALMER.